(12) United States Patent
Hu

(10) Patent No.: US 7,970,002 B2
(45) Date of Patent: Jun. 28, 2011

(54) SERVICE TRANSMISSION METHOD FOR MULTIMEDIA BROADCAST/MULTICAST SERVICE

(75) Inventor: Hao Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1157 days.

(21) Appl. No.: 11/433,252

(22) Filed: May 12, 2006

(65) Prior Publication Data

US 2006/0203756 A1 Sep. 14, 2006

Related U.S. Application Data

(63) Continuation of application No. PCT/CN2005/001251, filed on Aug. 12, 2005.

(30) Foreign Application Priority Data

Aug. 12, 2004 (CN) .......................... 2004 1 0056115

(51) Int. Cl.
H04J 3/26 (2006.01)
H04H 20/71 (2008.01)
H04W 4/00 (2009.01)

(52) U.S. Cl. ...... 370/432; 370/312; 370/329; 455/422.1
(58) Field of Classification Search .................. 370/335, 370/349; 455/414.1, 515, 519, 466
See application file for complete search history.

(56) References Cited

U.S. PATENT DOCUMENTS

| | | | |
|---|---|---|---|
| 6,385,461 B1 * | 5/2002 | Raith | 455/518 |
| 6,490,452 B1 * | 12/2002 | Boscovic et al. | 455/436 |
| 6,684,081 B2 * | 1/2004 | Sarkkinen et al. | 455/515 |
| 6,882,850 B2 * | 4/2005 | McConnell et al. | 455/453 |
| 6,987,749 B2 * | 1/2006 | Cai et al. | 370/335 |
| 7,239,880 B2 * | 7/2007 | Shaheen | 455/458 |
| 7,349,711 B2 * | 3/2008 | Hu et al. | 455/519 |
| 7,509,127 B2 * | 3/2009 | Wang et al. | 455/439 |
| 7,526,287 B2 * | 4/2009 | Hwang et al. | 455/422.1 |
| 2002/0077087 A1 * | 6/2002 | Li | 455/414 |
| 2003/0211855 A1 * | 11/2003 | Sarkkinen et al. | 455/466 |
| 2004/0081125 A1 | 4/2004 | Ranta-Aho et al. | |
| 2004/0131026 A1 * | 7/2004 | Kim et al. | 370/328 |

(Continued)

FOREIGN PATENT DOCUMENTS

CN 1496161 A 5/2004

(Continued)

OTHER PUBLICATIONS

International Search Report, dated Nov. 17, 2005, corresponding to PCT/CN2005/001251.

(Continued)

*Primary Examiner* — Man Phan
(74) *Attorney, Agent, or Firm* — Finnegan, Henderson, Farabow, Garrett & Dunner, LLP

(57) ABSTRACT

The present invention provides a service transmission method for MBMS, comprising: a core network initiates an MBMS service; having received a session start instruction of the MBMS service, the RNC selects the PTM mode or the PTP mode as a service bearer mode to bear the MBMS service for each cell that belongs to the RNC. The method of the invention makes it possible to directly adopt the PTM mode or the PTP mode to bear an MBMS service, skipping the complicated Counting process adopted by the prior art, reducing the complexity of the system, decreasing interaction of signaling of the air interface, and lowering power consumption of the UE.

13 Claims, 3 Drawing Sheets

U.S. PATENT DOCUMENTS

| | | | |
|---|---|---|---|
| 2004/0146041 A1 | 7/2004 | Lee et al. | |
| 2004/0152453 A1 | 8/2004 | Hayashi | |
| 2004/0157640 A1* | 8/2004 | Pirskanen et al. | 455/552.1 |
| 2004/0229572 A1* | 11/2004 | Cai et al. | 455/69 |
| 2005/0007971 A1* | 1/2005 | Jeong et al. | 370/312 |
| 2005/0096017 A1* | 5/2005 | Kim | 455/414.1 |
| 2005/0111393 A1* | 5/2005 | Jeong et al. | 370/312 |
| 2005/0111395 A1* | 5/2005 | Hwang et al. | 370/313 |
| 2005/0118992 A1* | 6/2005 | Jeong et al. | 455/422.1 |
| 2005/0169202 A1* | 8/2005 | Ratasuk et al. | 370/312 |
| 2005/0195760 A1* | 9/2005 | Lee et al. | 370/312 |
| 2005/0237972 A1* | 10/2005 | Van Dervelde et al. | 370/329 |
| 2005/0270996 A1* | 12/2005 | Yi et al. | 370/312 |
| 2006/0062179 A1* | 3/2006 | Simonsson et al. | 370/328 |
| 2006/0072509 A1* | 4/2006 | Lindoff et al. | 370/332 |
| 2006/0094408 A1* | 5/2006 | Hu et al. | 455/414.1 |
| 2006/0251099 A1* | 11/2006 | Kim et al. | 370/432 |
| 2007/0070972 A1* | 3/2007 | Wang et al. | 370/349 |
| 2007/0082690 A1* | 4/2007 | Fabien et al. | 455/518 |
| 2007/0105557 A1* | 5/2007 | Israelsson et al. | 455/436 |
| 2007/0287392 A1* | 12/2007 | Sagne et al. | 455/119 |
| 2008/0076359 A1* | 3/2008 | Charpentier et al. | 455/63.1 |

FOREIGN PATENT DOCUMENTS

| | | |
|---|---|---|
| CN | 1518255 A | 8/2004 |
| EP | 1 401 152 A2 | 3/2004 |
| EP | 1401152 A2 | 3/2004 |
| JP | 2000-209298 | 7/2000 |
| JP | 2001-505021 | 4/2001 |
| JP | 2002-335556 | 11/2002 |
| JP | 2004-221701 | 8/2004 |
| WO | WO 2004/017541 A1 | 2/2004 |
| WO | WO 2004/039100 A2 | 5/2004 |
| WO | WO 2004/064342 A1 | 7/2004 |
| WO | WO 2004/100400 | 11/2004 |

OTHER PUBLICATIONS

Partial English translation of Russian Office action corresponding to priority Chinese application 2004100561153.9, indicating relevance of listed EP 1 401 152 reference in this IDS.

English translation of the Written Opinion of the International Searching Authority for International application No. PCT/CN2005/001251, mailed Nov. 17, 2005, 3 pgs.

Preliminary Notice of Rejection issued by the Japanese Patent Office on Oct. 27, 2009 for application No. 2007-525151, 3 pgs., partial English translation attached.

Notice of Final Rejection issued by the Japanese Patent Office on Jun. 22, 2010 for application No. 2007-525151, 4 pgs., partial English translation attached.

$3^{rd}$ Generation Partnership Project; 3GPP TS 25.346 v2.6.0; Technical Specification Group Radio Access Network; Introduction of the Multimedia Broadcast Multicast Service (MBMS) in the Radio Access Network (RAN); Stage 2 (Release 6), dated Feb. 2004, 49 pgs.

$3^{rd}$ Generation Partnership Project; 3GPP TS 25.346 v6.1.0; Technical Specification Group Radio Access Network; Introduction of the Multimedia Broadcast Multicast Service (MBMS) in the Radio Access Network (RAN); Stage 2 (Release 6), dated Jun. 2004, 51 pgs.

$3^{rd}$ Generation Partnership Project; 3GPP TS 25.346 v6.3.0; Technical Specification Group Radio Access Network; Introduction of the Multimedia Broadcast Multicast Service (MBMS) in the Radio Access Network (RAN); Stage 2 (Release 6), dated Dec. 2004, 58 pgs.

Extended European Search Report from the European Patent Office for Application No. 05780741.4-2412, dated Nov. 25, 2010, 7 pgs.

European Patent Office Communication pursuant to Article 94(3) EPC, European search opinion for Application No. 05780741.4, mailed Mar. 28, 2011, Huawei Technologies C., Ltd.

* cited by examiner

SERVICE TRANSMISSION METHOD FOR MULTIMEDIA BROADCAST/MULTICAST SERVICE

CROSS-REFERENCE TO RELATED APPLICATIONS

This application is a Continuation Application of International Application Number PCT/CN2005/001251, filed on Aug. 12, 2005, which claims priority of Chinese Patent Application Number 200410056115.9, filed on Aug. 12, 2004.

FIELD OF THE TECHNOLOGY

The invention relates to service transmission technology in general. More specifically, the invention relates to a service transmission method for a Multimedia Broadcast/Multicast Service (MBMS),

BACKGROUND OF THE INVENTION

Multicast or broadcast is a technology of data transmission from a single data source to multiple destinations. In the traditional mobile networks, Cell Broadcast Service (CBS) permits the data of low bit-rate to be transferred to all the users via a shared broadcast channel of the cell. The CBS service is a type of message services.

At present, telephone and message services are not enough to satisfy people's demands of mobile communication. With the rapid development of the Internet, many kinds of multimedia services come forth, wherein some application services require multiple users to receive the same data at the same time, such as Video-On-Demand (VOD), telecast, video conference, network-based education and interactive video games. Compared with common data services, the mobile multimedia services have such features as large data capacity, long duration and high sensitivity to time delay. The mobile networks have specific network structure, function entities and wireless interfaces, which are very different from the cable IP networks. Therefore, the existing IP multicast technologies are only applicable to the cable IP networks, but not to the mobile networks.

To utilize resources of the mobile networks effectively, WCDMA/GSM International Organization for Standardization (ISO) 3GPP has put forward a concept of Multimedia Broadcast/Multicast Service (MBMS) service to provide point-to-multipoint services of transmitting data from one data source to multiple users, which realizes shared utilization of network resources, improves the efficiency thereof, especially the utilization efficiency of the air interface resource. The MBMS defined by the 3GPP can not only realize the multicast/broadcast of plain text and low data-rate message, but also support high-speed multimedia multicast/broadcast services, which undoubtedly conforms to the development trend of the future mobile communication.

FIG. 1 illustrates a wireless network architecture that supports multicast/broadcast services. As shown in FIG. 1, in the existing specifications of 3GPP, a wireless network entity that supports multicast/broadcast services is a Broadcast/Multicast Service Center (BM-SC) 101. The BM-SC 101 is connected with a Gateway GPRS Support Node (GGSN) 102 through a Gmb interface or a Gi interface, and one BM-SC 101 can be connected with multiple GGSNs 102. The GGSN 102 is connected with a Serving GPRS Support Node (SGSN) 103 through a Gn/Gp interface, and one GGSN 102 can be connected with multiple SGSNs 103. The SGSN 103 is connected with a UMTS Terrestrial Radio Access Network (UTRAN) 104 through an Iu interface, and the UTRAN 104 is connected with a UE 106 through a Uu interface. The SGSN 103 may also be connected with a GSM Enhanced Radio Access Network (GERAN) 105 through an Iu/Gb interface, and the GERAN 105 is connected with a UE 107 through a Um interface.

The network architecture in FIG. 1 shows that, to support the MBMS service, a mobile network function—Broadcast/Multicast Service Center, i.e. a BM-SC, is added in the 3G Mobile Communication System. The BM-SC is an entrance for an Internet Content Provider (ICP), which is used for authorization and to initiate MBMS bearer services on the mobile networks as well as to schedule and deliver the MBMS transmissions. In addition, functions related to MBMS are added to such functional entities as UE, UTRAN, GERAN, SGSN and GGSN.

MBMS includes a multicast mode and a broadcast mode, wherein the multicast mode needs users to subscribe to a corresponding multicast group, activate services and generate relevant billing information. Different service demands of multicast mode and broadcast mode result in different procedures of respective services. FIG. 2 is a flowchart of the MBMS multicast mode and FIG. 3 is a flowchart of the MBMS broadcast mode.

As shown in FIG. 2, the processes related to the MBMS multicast service comprises: Subscription, Service announcement, Joining, Session Start, MBMS notification, Data transfer, Session Stop and Leaving. The Subscription process is used to make users subscribe to services which the users needed in advance. The Service announcement process is a process of the BM-SC announcing the services that can be provided currently. The Joining process is an activation of the MBMS multicast service, through which the UE informs the network that the UE wants to be a member of a current multicast group voluntarily and to receive multicast data of the corresponding services. In the Joining process, MBMS UE context that records the UE information is created on both the network and the UE joining the multicast group. In the process of Session Start, the BM-SC gets ready to transfer data and instructs the network to establish bearer resources of the corresponding core network and access network. MBMS notification process is used to inform UE that an MBMS multicast session is about to start. In the process of Data transfer, the BM-SC transfers the data to the UE through the bearer resources established in the Session Start process.

The MBMS service has two modes for transmission between the UTRAN and the UE: a point-to-multipoint (PTM) mode and a point-to-point (PTP) mode. In the PTM mode, same data are transferred through an MBMS point-to-multipoint Traffic Channel (MTCH), and all the UE joining in multicast services or interested in broadcast services can receive the data. In the PTP mode, data are transferred through a Dedicated Channel (DTCH), and only the relevant UE can receive the data. The Session Stop process is used to release the bearer resources established in the process of the Session Start. The Leaving process makes the subscribers of a group leave this multicast group, which means the users will not receive the multicast data any more. In the Leaving process, the relevant MBMS UE context is deleted.

As shown in FIG. 3, processes related to the MBMS broadcast service are similar to those of the MBMS multicast service. However, in the MBMS broadcast service, the Subscription and Joining processes are not needed before the Session Start process, and the Leaving process is not needed after the Session Stop process.

As shown in FIG. 2, in the MBMS multicast service, the processes of Joining and Session Start are independent from each other, i.e. a user may join a multicast service before a session is started or at any time during the session after the session is started.

Generally, after the Session Start process of a certain MBMS service, the RNC will adopt an appropriate bearer mode, a PIP mode or a PTM mode, according to the number of the users receiving the MBMS service in one cell. For the PTP mode, a user DCH that receives the service, such as a Dedicated Physical Channel (DPCH), is used as the bearer of the MBMS traffic; while for the PTM mode, a common channel (FACH), such as a Secondary Common Control Physical Channel (SCCPCH) is used as the bearer of the MBMS traffic. The number of the users receiving the MBMS service in a cell is obtained by a Counting process.

In existing protocols, the procedures of the CN and UTRAN processing a certain MBMS service specifically comprise:

1) In a Joining process, a user instructs the network to get ready to receive the MBMS service;

2) In an MBMS Session Start process, the CN notifies the UTRAN that a certain MBMS service session is about to start, wherein the Session Start notification contains an ID and a property of the MBMS service;

3) Having received the Session Start notification, the UTRAN initiates Counting processes in the cells that the MBMS service is requested to select a proper bearer mode of the MBMS service for the cells;

4) During the MBMS service session, processes of recounting users are carried out to verify whether the selected bearer mode is proper or not.

However, there are some disadvantages in the prior art. According to the solution in the prior art, in order to select a bearer mode for an MBMS service, a Counting or Recounting process is likely to be performed at the beginning of the session or during the session of the MBMS service. Such a process of selecting the proper bearer mode by counting or recounting is very complicated and time consuming. For example, in the counting process, it has to be taken into account whether users of different states currently demand the MBMS service or not. For users in idle state but having the demand for the MBMS service, an RRC (Radio Resource Control) connection should be established; the idle-state users have to perform the probability detection, and initiate the random access process in the Random Access Channel (RACH) if passing the detection. As a result, there will be a heavy load of signaling in the air interface, and blocks are likely to come forth in the upstream direction. For users in the URA-PCH (UTRAN Registration Area Paging Channel) state, on the other hand, a cell updating process is needed. Moreover, after a Counting process stops, according to the algorithm of Radio Resource Management (RRM), some or all users are likely to return to the idle state or x-PCH state, such as CELL-PCH state or URA-PCH state.

In addition, counting errors during the Counting process may result in the establishment of improper bearer mode, which means the Counting process has not played the proper role. Moreover, to accomplish counting, the power consumption at the UE will be increased during the random access process and the cell updating process performed by the idle-state users or URA-PCH-state users.

It can be seen from the above description that the system has to perform the Counting process at a relatively great cost.

SUMMARY OF THE INVENTION

The invention provides a service transmission method for an MBMS service, directly adopting a PTP or a PTM mode to bear the MBMS service and skipping the complicated Counting process adopted by the prior art.

The service transmission method for an MBMS service comprises the following steps:

a. a CN initiates an MBMS service;

b. upon receiving a session start instruction of the MBMS service, a RNC selects the PTM mode or the PTP mode as a service bearer mode to bear the MBMS service for each cell that belongs to the RNC.

In step b, the RNC selects one of the PTM mode and the PTP mode according to the characteristics of the MBMS service and/or the current load of the each cell.

In step b, the RNC selects a service bearer mode for each cell separately.

The method further comprises: defines a service load threshold for each cell that belongs to the RNC in advance; then the selection in step b comprises: the RNC judges whether a service load of each cell that belongs to the RNC is less than the service load threshold respectively, if yes, selects the PTM mode; otherwise, selects the PTP mode, wherein the service load threshold of each cell that belongs to the RNC can be identical or different.

The method further comprises: defines a duration threshold of an MBMS service session in advance; then the selection in step b comprises: the RNC judges whether a duration of an MBMS session is less than the duration threshold, if yes, selects the PTM mode; otherwise, selects the PTP mode.

The method further comprises: defines a service load threshold and a cell proportion threshold in advance; then the selection in step b comprises: the RNC judges whether the number of the cells, in which there are users requesting the MBMS service and a service load is less than the service load threshold, reaches the cell ratio threshold, if yes, selects the PTM mode; otherwise, selects the PTP mode.

The method further comprises: defines a threshold of interference among cells in advance; then the selection in step b comprises: the RNC judges whether interference among the cells in which there are users requesting the MBMS service is less than the interference threshold, if yes, selects the PTM mode; otherwise, selects the PTP mode.

The step of the CN initiating an MBMS service comprises: the CN sends to the RNC a session start instruction of the MBMS service containing a bearer mode indication; then the selection in step b comprises: the RNC selects the PTM mode or the PTP mode according to the bearer mode indication.

The method further comprises: stores a relationship between types of MBMS services and the bearer modes in the RNC in advance; then the selection in step b comprises: the RNC selects the PTM mode or the PTP mode according to the type of the MBMS service and the relationship between types of MBMS services and bearer modes.

The method further comprises: divides users into different levels, and defines the relationship between the user levels and the bearer modes in advance; then the selection in step b comprises: the RNC selects one of the PTM mode and the PTP mode according to the level of the user currently requesting the MBMS service and the relationship between the user levels and the bearer modes.

The relationship between the user levels and the bearer modes is that each user level corresponds to a bearer mode; or a defined dividing level so that, when a user is requesting an MBMS service, the PTP mode is selected if the user level is higher than or equal to the dividing level or the PTM mode is selected if the user level is lower than the dividing level, and the RNC will select the PTP mode only for the users with relatively high priority level when providing services.

A radio network controller (RNC) comprises at least one component configured to:

receive a session start instruction of a multimedia broadcast/multicast service (MBMS) initiated by a core network, select one of a point-to-multipoint (PTM) mode and a point-to-point (PTP) mode as a service bearer mode to bear the MBMS service for each cell that belongs to the RNC.

The MBMS service transmission method provided in the present invention directly selects a PTM or PTP mode as a certain service bearer mode, skipping the complicated Counting/Recounting process adopted by the prior art, and reducing the signaling interaction on the wireless channels and the power consumption of the UE. More specifically, when there is less service provided in a cell or a load of a cell is not heavy, the PTM bearer mode is adopted directly without the Counting process for the MBMS services with certain characteristics, such as the MBMS services with relatively short duration. When the load of the cell is relatively heavy, however, the existing services in the system will be badly affected if the PTM bearer mode is adopted, hence the FTP bearer mode can be adopted for some or all users. In this way, impact on the existing services in the system could be the minimum while the MBMS service could be provided in the cell.

EMBODIMENTS OF THE INVENTION

In accordance with a service transmission method for an MBMS service, a RNC selects a PTM bearer mode or a PTP bearer mode for a current MBMS service according to such factors as traffic load, demand for MBMS services, MBMS service characteristics, MBMS service circumstances, network load and user levels. The RNC can also adopt the PTM mode or the PTP mode directly according to an instruction from the network.

The RNC selects the bearer mode for an MBMS service in each cell respectively, and the service bearer modes selected for different cells have no impact on each other.

Embodiment 1

Figure 1:
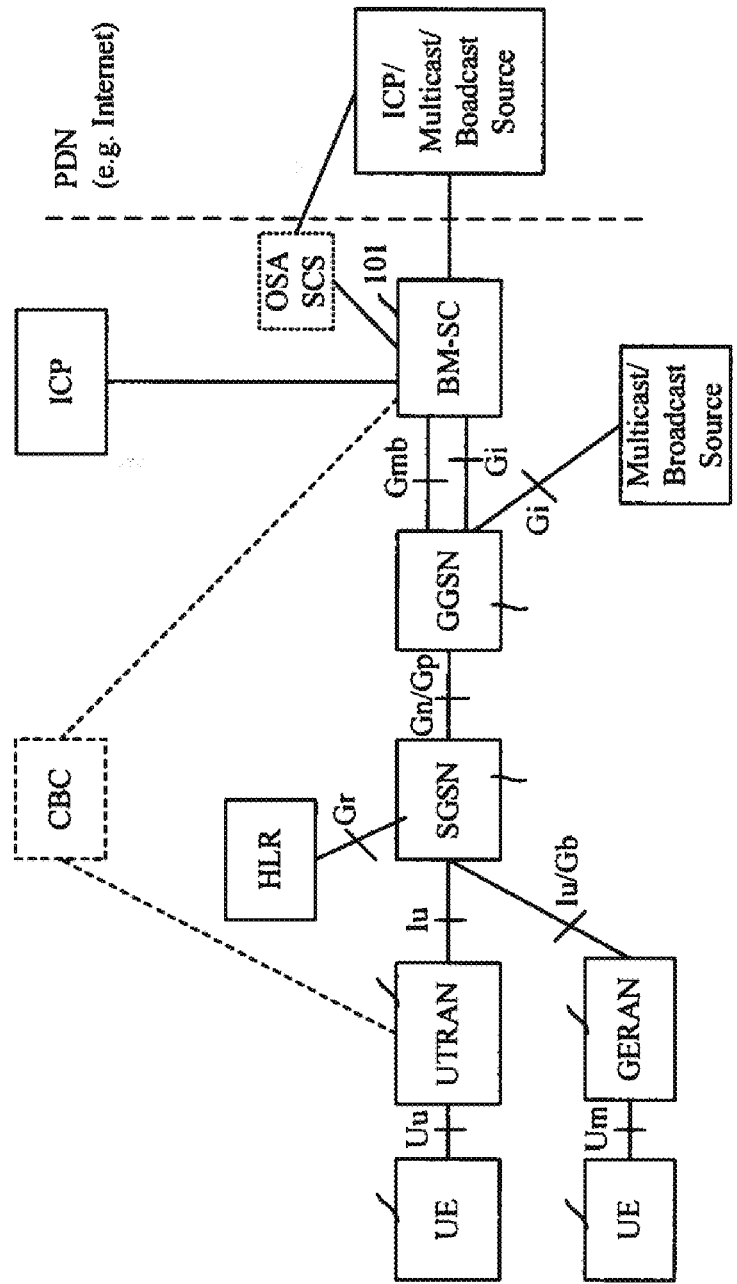
FIG. 1 illustrates an architecture of a wireless network supporting Multimedia Broadcast/Multicast Service.
Figure 2:
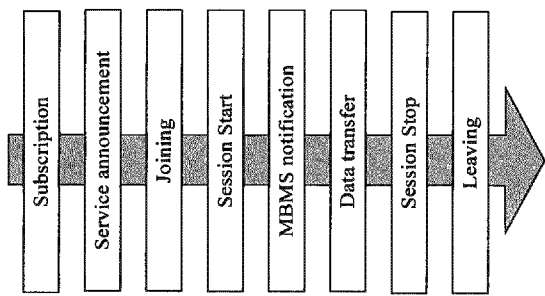
FIG. 2 is a flowchart of an MBMS multicast mode.
Figure 3:
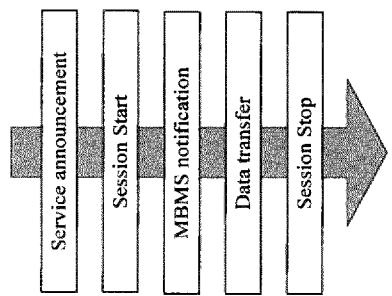
FIG. 3 is a flowchart of an MBMS broadcast mode.
Figure 4:
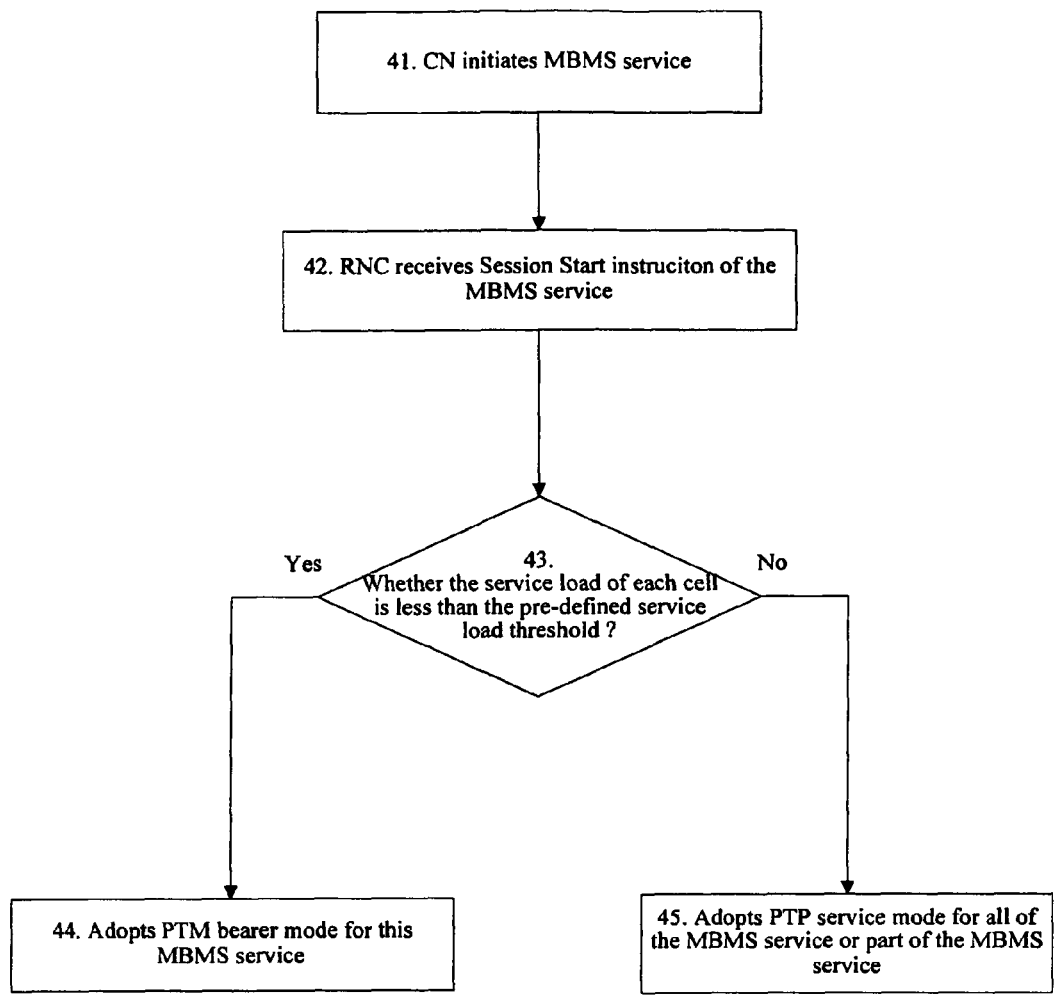
FIG. 4 is a flowchart of a process in accordance with a method of the invention.

In this embodiment, having received a Session Start instruction of the MBMS service, the RNC selects the PTM bearer mode or PTP bearer mode according to a traffic load. In this embodiment, the operator defines a service load threshold of each cell in advance. As shown in FIG. 4, the MBMS service transmission method in accordance with this embodiment comprises the steps of:

Step 41: A CN sends to the RNC an MBMS Session Start instruction in connection with a certain MBMS service;

Steps 42~45: Having received the MBMS Session Start instruction, the RNC judges whether the service load of each cell belonging to the RNC is less than the pre-defined service load threshold of the each cell. If yes, it means the service load of the corresponding cell is relatively light, then the RNC informs the users of the cell through an MBMS Service Information message that the PTM bearer mode is adopted for the MBMS service without going through a Counting process; otherwise, it means the service load thereof is relatively heavy, then the RNC judges whether the PTP bearer mode can be directly adopted in this cell according to a current actual service load of the cell. If the current actual service load indicates that the service can still be supported by the PTP bearer mode, the PTP mode is adopted; otherwise, the MBMS service is not provided.

Each cell can define identical or different service load thresholds in advance, i.e. each cell can separately selects the PTM bearer mode according to different load circumstances.

Embodiment 2

In this embodiment, having received an MBMS Session Start instruction of the MBMS service, the RNC selects the PTM bearer mode or PTP bearer mode according to a session duration of the MBMS service. In this embodiment, the operator defines a duration threshold in advance. Then the steps 42~45 in this embodiment are:

Having received the Session Start instruction of the MBMS service, the RNC judges whether the session duration of this MBMS service is less than the pre-defined duration threshold. If yes, it means the session duration of the MBMS service is relatively short, then the RNC informs the users through an MBMS Service Information message that the PIM bearer mode is adopted for the MBMS service without going through a Counting process; otherwise, it means the session duration of the MBMS service is relatively long, then the RNC determines according to an actual session duration whether to adopt the PTP mode directly in the cell or to provide no MBMS service.

Embodiment 3

In this embodiment, having received a Session Start instruction of the MBMS service, the RNC selects the PTM bearer mode or PTP bearer mode according to a service load and a cell ratio with MBMS service demand. In this embodiment, the operator defines a service load threshold and a cell ratio threshold. Then the steps 42~45 in this embodiment are:

Having received the Session Start instruction of the MBMS service, the RNC judges whether the number of the cells in which there are users requesting the MBMS service and the service loads are less than the pre-defined service load threshold reaches the cell ratio threshold, for example, 80%. If yes, the RNC informs the users through an MBMS Service Information message that the PTM bearer mode is adopted for the MBMS service; otherwise, the RNC judges whether the PTP bearer mode is directly adopted in a cell according to a current actual service load of the cell. If the current actual service load indicates that the service can be supported by the PTP bearer mode, then the PTP mode is adopted; otherwise, the MBMS service is not provided.

Embodiment 4

In this embodiment, having received a Session Start instruction of the MBMS service, the RNC selects the PTM bearer mode or PTP bearer mode according to interference among the cells with demand for the MBMS service. In this embodiment, a threshold of interference among cells is defined in advance. Then the steps 42~45 in this embodiment are:

Having received a Session Start instruction of the MBMS service, the RNC judges whether the interference among the cells with demand for this MBMS service is less than the pre-defined interference threshold. If yes, it means that the interference among the cells is relatively light, then the RNC informs the users through an MBMS Service Information message that the PTM bearer mode is adopted for the MBMS service; otherwise, it means the interference among the cells is relatively heavy, and then the PTP mode is adopted to bear the MBMS service.

Here, the specific method for calculating the interference among the cells can be determined by the operator itself. For example, determine the distribution of all the cells that receive the MBMS service according to the network topology, and then estimate the interference among the cells according to the distribution.

Embodiment 5

In this embodiment, when the CN initiates an MBMS service, the bearer mode of this MBMS service is designated at the same time, which is carried by a Session Start instruction of the MBMS service. Thus, after the RNC receives a certain MBMS service initiated by the CN, the designated bearer mode is directly adopted to bear the MBMS service for all the users of a cell.

Embodiment 6

In this embodiment, store in the RNC in advance a corresponding relationship between types of MBMS services and bearer modes. The operator can determine the one-to-one relationship between types of MBMS services and bearer modes in advance. Having received a certain MBMS service initiated by the CN, the RNC finds the bearer mode according to the pre-stored corresponding relationship and the type of the current MBMS service, and then the MBMS service is transferred to all the users of a cell through the bearer mode determined according to the corresponding relationship.

Embodiment 7

In this embodiment, whether the PTM mode or VIP mode is selected is decided according to the user levels. More specifically, the users are divided into different levels, and all the user levels for receiving MBMS services are stored in the network. Furthermore, it is determined in advance that the PTP mode is used to bearer services for the users whose levels are higher than or equal to a certain level, and PTM mode is adopted for the users whose levels are lower than a certain level. The corresponding relationship between different user levels and bearer modes can also be determined in advance. Thus, after receiving a certain MBMS service initiated by the CN, the RNC selects the corresponding bearer mode according to the user level.

Embodiment 8

If the network load is extraordinarily heavy, and when the RNC can not adopt the PTM mode after receiving a certain MBMS service initiated by the CN, then the number of the users requesting the MBMS service in a cell can be obtained through a Counting process. If the current load of the cell permits the provision of the service in the PTP mode for all the users, the PTP bearer will be created; if the current load of the cell permits the provision of the service in the PTP mode for some of the users, then the PTP bearer will be created only for the high-level users; if no bearer can indeed be created in the cell for this MBMS service, the MBMS service will not be provided. The high-level user means the user with relatively high priority when the networks provide services.

Here, whether the load is heavy or light is usually decided by operators according to actual conditions of their own. For example, for operator A, if he requires relatively high QoS (quality of service), the network load higher than 60% may be regarded as heavy; while for operator B, if he requires relatively low QoS, maybe the network load higher than 80% is regarded as heavy.

The foregoing description is only preferred embodiments of this invention and is not used to limit the protection scope of the invention.

The invention claimed is:

1. A service transmission method for a multimedia broadcast/multicast service (MBMS service) comprising:
   receiving, by a radio network controller (RNC), a session start instruction of the MBMS service from a core network (CN);
   selecting, by the RNC, a service bearer mode to carry the MBMS service for a cell that belongs to the RNC; and
   providing, by the RNC, the MBMS service using the selected service bearer mode for the cell,
   wherein the service bearer mode is a point-to-multipoint (PTM) mode or a point-to-point (PTP) mode, and the selecting the bearer mode is based on a characteristic of the MBMS service or a current service load of the cell.

2. The method according to claim 1, wherein there are multiple cells belonging to the RNC, and selecting a service bearer mode for the cell comprises:
   selecting, by the RNC, a service bearer mode for each of the cells separately.

3. The method according to claim 1,
   wherein selecting the service bearer mode is based on the current service load of the cell, and wherein selecting a service bearer mode for the cell comprises:
   judging, by the RNC, whether the current service load of said cell is less than a predefined service load threshold;
      if the current service load is less than the predefined service load threshold, selecting the PTM mode for the cell;
      if the current service load is not less than the predefined service load threshold, selecting the PTP mode for the cell.

4. The method according to claim 1,
   wherein selecting the service bearer mode is based on the characteristic of the MBMS service, and wherein selecting a service bearer mode for the cell comprises:
   judging, by the RNC, whether a session duration of the MBMS service is less than a predefined duration threshold of a MBMS service session;
      if the session duration is less than the predefined duration threshold, selecting the PTM mode for the cell;
      if the session duration is not less than the predefined duration threshold, selecting the PTP mode for the cell.

5. The method according to claim 1,
   wherein selecting the service bearer mode is based on the current service load of the cell, and wherein selecting a service bearer mode for the cell comprises:
   judging, by the RNC, whether a cell ratio reaches a predefined cell ratio threshold, wherein the cell ratio is a ratio of the number of one or more first cells to the total number of the cells that belong to the RNC, in the one or more first cells there are users requesting the MBMS service, and a service load of each of the one or more first cells is less than a predefined service load threshold;
      if the cell ratio reaches the predefined cell ratio threshold, selecting the PTM mode for the cells that belong to the RNC;

if the cell ratio does not reach the predefined cell ratio threshold, selecting the PTP mode for the cells that belong to the RNC.

6. A service transmission method for a multimedia broadcast/multicast service (MBMS service) comprising:
   receiving, by a radio network controller (RNC), a session start instruction of the MBMS service from a core network (CN);
   for cells that belong to the RNC, judging, by the RNC, whether an interference between the cells in which there are users requesting the MBMS service is less than a predefined interference threshold;
      if the interference is less than the predefined interference threshold, selecting a point-to-multipoint (PTM) mode as a service bearer mode to carry the MBMS service for the cells;
      if the interference is not less than the predefined interference threshold, selecting a point-to-point (PTP) mode as the service bearer mode to carry the MBMS service for the cells; and
   providing, by the RNC, the MBMS service using the selected service bearer mode for the cells.

7. A service transmission method for a multimedia broadcast/multicast service (MBMS service) comprising:
   receiving, by a radio network controller (RNC), a session start instruction of the MBMS service from a core network (CN), wherein the session start instruction contains a bearer mode indication;
   selecting, by the RNC, a point-to-multipoint (PTM) mode or a point-to-point (PTP) mode according to the bearer mode indication; and
   providing, by the RNC, the MBMS service using the selected service bearer mode for a cell that belongs to the RNC.

8. The method according to claim 1,
   wherein selecting the service bearer mode is based on the characteristic of the MBMS service, and wherein selecting the service bearer mode for the cell comprises:
   selecting, by the RNC, the PTM mode or the PTP mode according to a type of the MBMS service and a relationship, stored in the RNC, between types of MBMS services and the bearer modes.

9. A radio network controller (RNC) comprising:
   a receiving unit, configured to receive a session start instruction of a multimedia broadcast/multicast service (MBMS service) initiated by a core network,
   a selecting unit, configured to select a point-to-multipoint (PTM) mode or a point-to-point (PTP) mode as a service bearer mode according to a characteristic of the MBMS service or a current load of a cell that belongs to the RNC; and
   a providing unit, configured to provide the MBMS service using the selected service bearer mode for the cell.

10. The RNC according to claim 9, wherein the selecting unit is configured to:
   judge whether the current service load of the cell is less than a predefined service load threshold;
      if the current service load is less than the predefined service load threshold, select the PTM mode for the cell;
      if the current service load is not less than the predefined service load threshold, select the PTP mode for the cell.

11. The RNC according to claim 9, wherein the selecting unit is configured to:
   judge whether a session duration of the MBMS service is less than a predefined duration threshold of a MBMS service session;
      if the session duration is less than the predefined duration threshold, select the PTM mode for the cell;
      if the session duration is not less than the predefined duration threshold, select the PTP mode for the cell.

12. The RNC according to claim 9, wherein the selecting unit is configured to:
   judge whether a cell ratio reaches a predefined cell ratio threshold, wherein the cell ratio is a ratio of the number of one or more first cells to the total number of the cells that belong to the RNC, in the one or more first cells there are users requesting the MBMS service, and a service load of each of the one or more first cells is less than a predefined service load threshold;
      if the cell ratio reaches the predefined cell ratio threshold, select the PTM mode for the cells that belong to the RNC;
      if the cell ratio does not reach the predefined cell ratio threshold, select the PTP mode for the cells that belong to the RNC.

13. The RNC according to claim 9, wherein the selecting unit is configured to:
   select the PTM mode or the PTP mode according to a type of the MBMS service and a relationship, stored in the RNC, between types of MBMS services and bearer modes.

* * * * *